United States Patent [19]

Surmely et al.

[11] Patent Number: 5,396,139
[45] Date of Patent: Mar. 7, 1995

[54] POLYPHASE ELECTROMAGNETIC TRANSDUCER HAVING A MULTIPOLAR PERMANENT MAGNET

[75] Inventors: Gérard Surmely, Yverdon; Daho Taghezout, Lausanne, both of Switzerland

[73] Assignee: Eta SA Fabriques d'Ebauches, Granges, Switzerland

[21] Appl. No.: 123,845

[22] Filed: Sep. 9, 1993

[30] Foreign Application Priority Data

Sep. 24, 1992 [FR] France ................. 92 11511

[51] Int. Cl.⁶ .................. H02K 1/12; H02K 1/27
[52] U.S. Cl. .................. 310/254; 310/156; 310/179; 310/184
[58] Field of Search .......... 310/40 MM, 49 R, 49 A, 310/156, 162, 165, 112, 179, 180, 184, 185, 208, 254, 257

[56] References Cited

U.S. PATENT DOCUMENTS

| | | | |
|---|---|---|---|
| 2,553,359 | 11/1948 | Bertea | 310/254 |
| 3,818,690 | 6/1974 | Schwarzschild | 368/155 |
| 4,371,821 | 2/1983 | Laesser et al. | 318/696 |
| 4,629,924 | 12/1986 | Grosjean | 310/257 |
| 4,680,494 | 7/1987 | Grosjezn | 310/156 |
| 4,922,145 | 5/1990 | Shtipelman | 310/49 R |
| 5,289,071 | 2/1994 | Taghezout | 310/254 |
| 5,302,875 | 4/1994 | Taghezout | 310/156 |
| 5,321,330 | 6/1994 | Taghezout | 310/257 |

FOREIGN PATENT DOCUMENTS

| | | |
|---|---|---|
| 458056 | 11/1991 | European Pat. Off. . |
| 2380661 | 9/1978 | France . |
| WO87/03751 | 6/1987 | WIPO . |

*Primary Examiner*—Steven L. Stephan
*Assistant Examiner*—D. R. Haszko
*Attorney, Agent, or Firm*—Sughrue, Mion, Zinn, Macpeak & Seas

[57] ABSTRACT

The present invention concerns a polyphase electromagnetic transducer, the rotor (4) of which has a multipolar permanent magnet (10) including an even number of magnetic pole pairs (14) oriented along the direction of the rotation axis of such motor (4). First and second principal stator parts (22 and 24) extend respectively from either side of a rotor plane defined by the multipolar permanent magnet (10). The first principal stator part (22) defines at least three principal magnetic poles (30, 31 and 32) and secondary magnetic poles (38), these latter being defined by teeth (40) superposed onto the multipolar permanent magnet (10).

19 Claims, 7 Drawing Sheets

POLYPHASE ELECTROMAGNETIC TRANSDUCER HAVING A MULTIPOLAR PERMANENT MAGNET

The present invention concerns an electromagnetic transducer having a multipolar permanent magnet. More specifically, the present invention concerns a three-phase transducer with a multipolar permanent magnet exhibiting X pole pairs, X being an even number greater than two, such three-phase transducer being capable of use as a reverible electromagnetic transducer.

The electromagnetic transducer of the present invention is adapted to be used as a motor in numerous applications, for example for driving discs, reels or cassettes in the informatic or in the audiovisual domains. One can also use such electromagnetic transducer for driving the hand of an analog indicator such as a speedometer in an automobile or in an electronic watch.

BACKGROUND OF THE INVENTION

In the case of the electronic watch, there is generally employed an electromagnetic motor with a bipolar permanent magnet operating in a stepping mode, the rotor effecting a rotation of 180° per step. If the watch includes a seconds hand and the frequency of the steps is 1 Hz, it is then necessary to have a reduction by a factor of 30 between the rotor of the motor and such hand. The rotation of the rotor through 180° per step thus necessitates a gearing system serving for such reduction which brings about losses of energy essentially due to friction and generates a relatively substantial noise.

In a general manner, in order to obtain a quasi continuous stepping rotation with a bipolar permanent magnet, it is necessary to increase the frequency of operation of the motor and to provide a reduction mechanism between the rotor of such motor and the arrangement driven by such motor. This inevitably brings about additional energy losses and an increase in the costs of manufacture.

A purpose of the present invention is to provide an electromagnetic transducer enabling a stepping operation with a small angular displacement of the rotor per step.

A second purpose of the invention is to provide such an electromagnetic transducer capable of being easily miniaturized for a relatively low cost while possessing a good energy yield.

Finally, a third purpose of the invention is to provide such an electromagnetic transducer exhibiting a compact structure which assures a good yield relative to the useful energy and the volume of said transducer.

SUMMARY OF THE INVENTION

The present invention thus has as objective an electromagnetic transducer comprising a stator and a rotor mounted to rotate relative to the stator, said rotor being adapted to spin around a rotation axis, defined by a positioning axle of such rotor, and including a multipolar permanent magnet which defines a rotor plane perpendicular to said rotation axis and is formed by a set of rotor pole pairs arranged in a circular manner about said rotation axis, the number of such rotor pole pairs being even and greater than two, each rotor pole pair having a magnetic axis oriented substantially along the direction of said rotation axis with a sense opposite to that of the adjacent pole pairs and defining an angle $\alpha$ in said rotor plane relative to said rotation axis the value of which is substantially equal to 360° divided by said number of rotor pole pairs, said electromagnetic transducer being characterized in that it includes N magnetic energization means respectively associated with N magnetic flux guidance branches, N being an integer greater than two, and in that it comprises first and second principal stator parts and, the first principal stator part defining N principal magnetic poles magnetically insulated from one another by zones of high magnetic reluctance and comprising a first superposition portion superposed onto said multipolar permanent magnet relative to a projection thereof in said rotor plane, each of such principal magnetic poles comprising at least one secondary magnetic pole, which is at least partially superposed onto said said multipolar permanent magnet relative to a projection thereof in said rotor plane, said secondary magnetic poles substantially defining a first stator plane parallel to said rotor plane, each secondary magnetic pole defining in said first stator plane an angle relative to said rotation axis the value of which is substantially equal to that of said angle $\alpha$, each secondary pole of each of said principal magnetic poles being angularly shifted relative to each secondary pole of each of the two adjacent principal magnetic poles and relative to said rotation axis by a deviation angle the value of which, modulo the value of said angle $\alpha$ is equal to said value of such angle $\alpha$ divided by N, said second principal stator part defining a magnetic return pole a second superposition portion of which is superposed onto said multipolar permanent magnet relative to a projection thereof in said rotor plane, such second superposition portion substantially defining a second stator plane parallel to said rotor plane, said first and second stator planes being located on either side of said rotor plane, each of said magnetic flux guidance branches having a first end magnetically coupled to a different said principal magnetic pole and a second end magnetically coupled to said return pole.

According to an additional characteristic of the transducer according to the invention, each of said principal magnetic poles of said first principal stator part comprises at least two secondary magnetic poles the adjacent secondary magnetic poles belonging to a common principal magnetic pole being angularly shifted relative to one another in said first stator plane and relative to said rotation axis through an angle the value of which is substantially equal to twice the value of said angle $\alpha$.

According to another characteristic of the transducer according to the invention, the first and second principal stator parts respectively comprise first and second portions not superposed onto said multipolar permanent magnet relative to a projection thereof in said rotor plane, such first and second non-superposed portions being respectively located in first and second general planes substantially parallel to one another. Furthermore, the magnetic flux guidance branches are located in the region comprised between such first and second general planes.

According to a specific embodiment of the invention, the first or the second principal stator part is entirely planar.

In a principal embodiment of the invention, the return magnetic pole of said transducer belonging to the second principal stator part also comprises secondary poles superposed relative to a projection in said rotor plane at least partially onto said secondary poles of the first principal stator part and at least partially onto said multipolar permanent magnet, the secondary poles of the second stator part having an angular distribution in said second stator plane relative to said rotation axis substantially identical to that of the secondary poles of the first principal stator part.

According to specific embodiments of the transducer according to the invention, each secondary magnetic pole of the first principal stator part and/or of the second principal stator part is formed either by a different tooth from a circular crenellation, or by a different tooth coupled to other teeth of a common principal pole by a stiffening bridge or again by a summit of an undulation forming an annular section, such summit being located on the side of said multipolar permanent magnet relative to a median plane of the surface of such undulation.

Next, according to specific characteristics of the invention, the first superposition portion and/or the second superposition portion present(s) at least partially an overthickness in the direction of the multipolar permanent magnet relatively and respectively to the first general plane and/or to the second general plane of the stator or is at least partially dished in the direction of the multipolar permanent magnet relatively and respectively to the first general plane and/or to the second general plane of the stator.

Thanks to the characteristics of the invention described hereinbefore, the various purposes of the invention are attained.

Other characteristics of the invention will be forthcoming in a still better manner upon reading the following description made having reference to the attached drawings considered as non-limiting.

DESCRIPTION OF THE PREFERRED EMBODIMENTS

In referring hereinafter to FIGS. 1 to 3, there will be described a first embodiment of an electromagnetic transducer according to the invention.

Such electromagnetic transducer comprises a stator 2 and a rotor 4 mounted to rotate relative to such stator 2. Such rotor 4 comprises a positioning axle 6 which defines a rotation axis 8 and a multipolar permanent magnet 10 which defines a rotor plane 12 perpendicular to the rotation axis 8. The multipolar permanent magnet 10 is formed by a set of rotor pole pairs 14 exhibiting a magnetic axis 16 substantially parallel to the rotation axis 8 of the rotor.

It will be noted that the sense of the magnetic axis 16 of a rotor pole pair is of the opposite sense to the magnetic axis of the two adjacent rotor pole pairs. The number of rotor pole pairs composing the multipolar permanent magnet 10 is an even number greater than two. The rotor pole pairs are arranged in a circular manner about the rotation axis 8.

In the present embodiment, the multipolar permanent magnet 10 exhibits the form of a ring, comprising 20 rotor pole pairs 14, a non-magnetic disc 18 being arranged at the center of such ring and mounted on the positioning axle 6 of rotor 4 in a manner such that the multipolar permanent magnet 10 is fixed to the positioning axle 6.

It will be noted that the positioning axle 6 of rotor 4 can be rotatively mounted relative to stator 2, for example with the help of a positioning cage (not shown) or by any other assembly means of a transducer rotor, in particular for a motor as known to persons skilled in the art.

Figure 1:
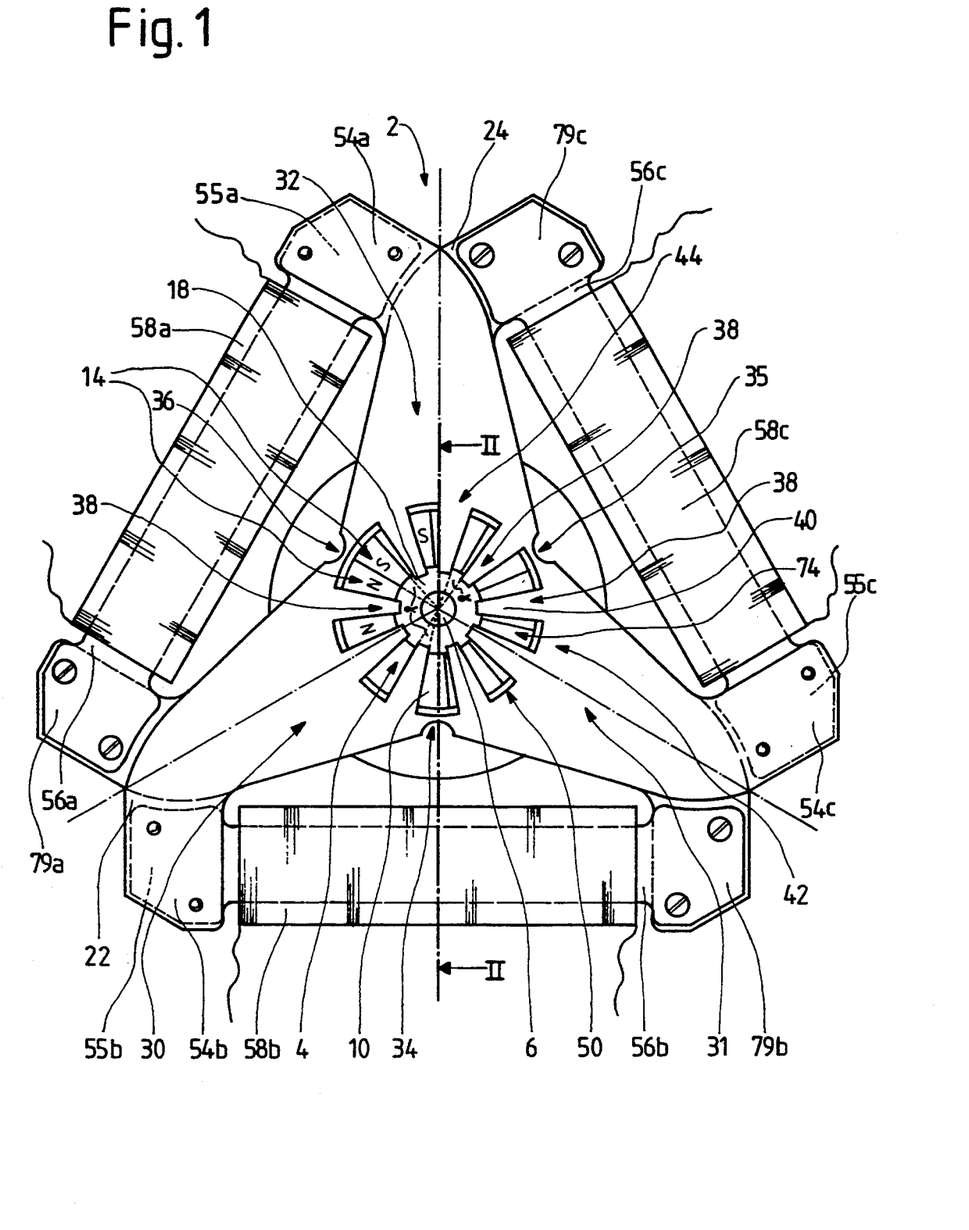
FIG. 1 is a top schematic view of a first embodiment of an electromagnetic transducer according to the invention.

In the first embodiment shown on FIG. 1, each of the rotor pole pairs 14 defines in the rotor plane 12 a common angle $\alpha$ relative to the rotation axis 8 of the rotor. Thus, in this first embodiment, angle 60 is equal to $360°/20° = 18°$. It will however be observed that the angle $\alpha$ defined by a rotor pole pair can encompass a non-magnetized portion located between two rotor pole pairs 14.

Stator 2 comprises a first principal stator part 22 and a second principal stator part 24. The first principal stator part 22 is located in a first general plane 26 while the second principal stator part 24 is located in a second general plane 28 of the transducer. Such two general planes 26 and 28 are situated on either side of the rotor plane 12.

The first stator part 22 defines three principal magnetic poles 30, 31 and 32. Such three magnetic poles are magnetically insulated from one another by necks 34, 35 and 36, such necks exhibiting high magnetic reluctance. Each of the principal poles 30, 31 and 32 comprises at least one secondary magnetic pole 38. Here it will be noted that the term pole always corresponds to a magnetic pole in the present description. Additionally, a pole is materialized by a region of a part which defines it.

In this first embodiment, each of the principal poles comprises three secondary poles 38. Each secondary pole 38 is formed by tooth 40 extending from the expansion 42 of the corresponding principal magnetic pole in the direction of the rotation axis 8. The set of teeth 40 forms a first circular crenellation 44 the castellations of which are formed by teeth 40. Such first circular crenellation 44 is arranged in a manner such that teeth 40 are at least partially superposed onto the multipolar permanent magnet 10 relative to a projection thereof in the rotor plane 12.

The set of secondary poles 38 defines a first stator plane 46, such stator plane 46 being parallel to the rotor plane 12. Each of teeth 40 forming secondary poles 38 defines an angle in the stator plane 46 relative to the rotation axis 8 equal to the angle $\alpha$ defined by each of the rotor pole pairs 14 of the multipolar permanent magnet 10. Thus, each of the teeth defines an angle at the axis of rotation 8 equal to 18° in such first embodiment of a transducer according to the invention.

Each of the castellations formed by a tooth 40 is separated from the two adjacent castellations by two embrasures 50. The angle formed by the embrasures separating two teeth of a common principal magnetic pole 30, 31 or 32 defines in the first stator plane 46 relative to the rotation axis 8 an angle equal to the angle $\alpha$ defined by each of teeth 40 and by each of the rotor pole pairs 14 of the multipolar permanent magnet 10.

On the other hand, each of teeth 38 belonging to a common principal magnetic pole 30, 31 or 32 is angularly shifted relative to a secondary pole belonging to an adjacent principal magnetic pole by an angle the value of which, modulo the value of angle $\alpha$, is equal to the value of such angle 60 divided by the number of phases of the transducer, namely three phases in the first embodiment. By the expression, modulo the value of angle $\alpha$, there is understood the result of the integral division by the value of angle $\alpha$. Thus, in the case of the first embodiment here shown, the angular shift between a tooth 40 belonging to a first principal magnetic pole and a tooth 40 belonging to an adjacent principal magnetic pole is equal to an integral number of times 18° plus 6°. There results from this configuration that the embrasures separating two teeth 40 belonging to different principal magnetic poles define in the first stator plane 46 relative to the rotation axis 8 an angle the value of which modulo the value of angle $\alpha$ is also equal to 6°.

Each of the three principal magnetic poles 30, 31 or 32 respectively comprises a fastening lug 54a, 54b or 54c. Each fastening lug 54a, 54b or 54c enables assuring respectively magnetic contact with a first end 55a, 55b or 55c of a magnetic flux guidance branch 56a, 56b or 56c on which is respectively assembled a winding 58a, 58b or 58c.

Figure 3:
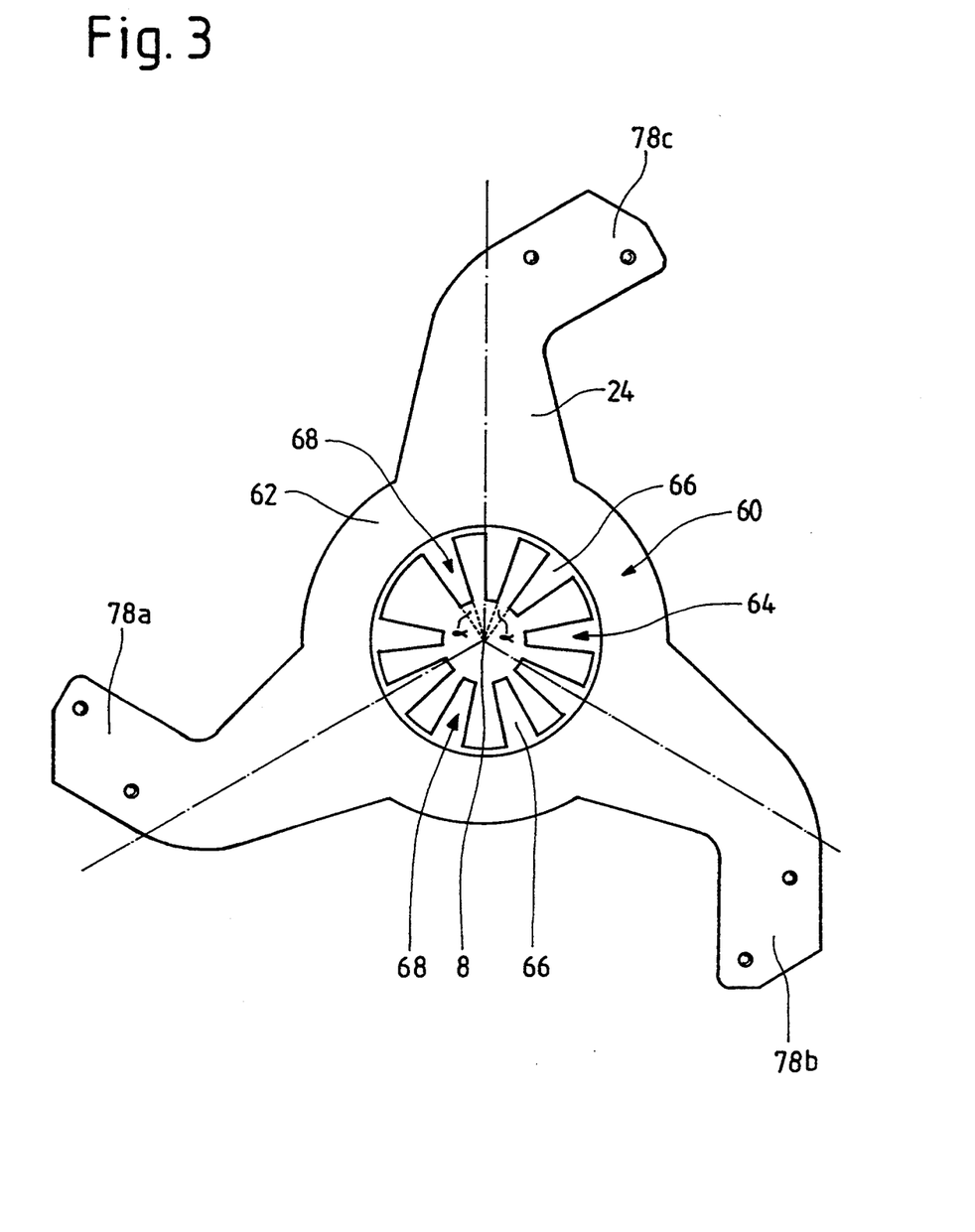
FIG. 3 is a top schematic view of a second principal stator part of said first embodiment.

On FIG. 3 is shown a top view of the second principal stator part 24. Such second principal stator part 24 defines a single return magnetic pole 60. Such return magnetic pole is defined by an annular portion 62 and by a second circular crenellation 64 substantially identical to the first circular crenellation 44. Such second circular crenellation 64 includes teeth 66 also defining secondary magnetic poles 68, the set of teeth 66 defining the secondary poles 68 defining a second stator plane 70. Such second stator plane 70 is situated on the other side of the first stator plane 46 relative to the rotor plane 12. In a preferred manner, the distance separating the second stator plane 70 from the rotor plane 12 is substantially equal to the distance separating such rotor plane 12 from the first stator plane 46.

Teeth 66 of the second circular crenellation 64 are at least partially superposed onto the multipolar permanent magnet 10. The castellations formed by teeth 66 of the second circular crenellations 64 as well as the embrasures separating such castellations show an angular distribution in the second stator plane 70 relative to the rotation axis 8 identical to said angular distribution of the first circular crenellation 44 of the first stator part 22.

In order to force the magnetic flux generated by any of the windings 58a, 58b and 58c to be propagated through the rotor pole pairs 14 of the multipolar permanent magnet 10, the circular crenellation 66 shows an over-thickness in the direction of the rotor plane 12 relative to the rest of the second principal stator part 24 located in the second general plane 28 of such transducer. It will be noted that it has been provided that the region exhibiting the over-thickness is entirely comprised in superposition relative to the rotor plane 12 within the circular opening 74 on the interior of which is formed the first circular crenellation 44 of the first stator part 22. The second principal stator part 24 further comprises three fastening lugs 78a, 78b and 78c, each of such lugs being respectively coupled to a second end 79a, 79b or 79c of a different magnetic flux guidance branch 56a, 56b or 56c.

Figure 2:
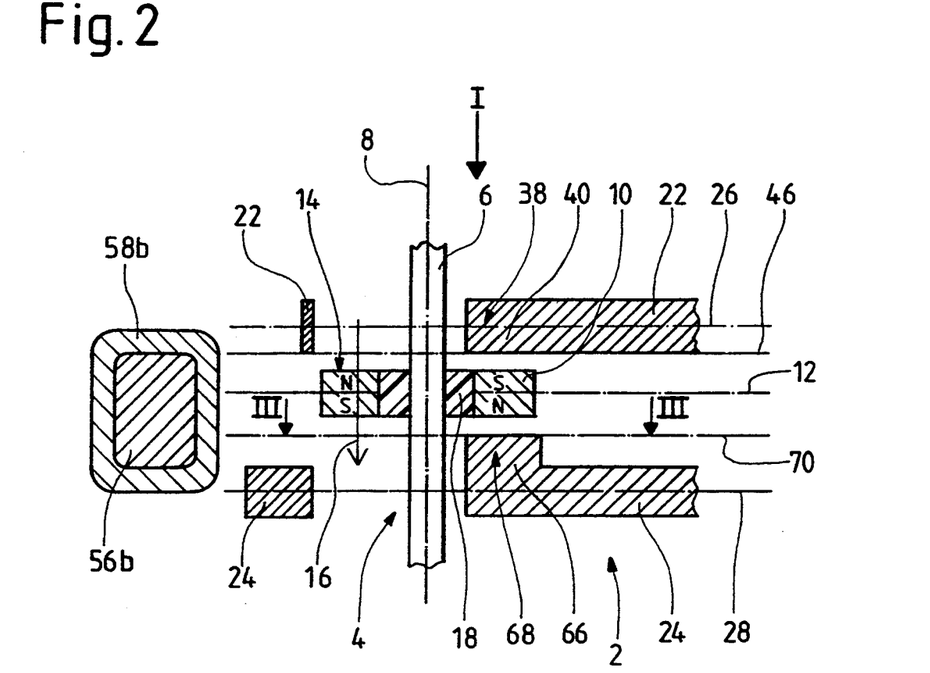
FIG. 2 is a cross-section of FIG. 1 along the section line II—II.

The transducer according to the invention shown on FIGS. 1 to 3 defines three principal magnetic circuits, each of such circuits being associated with a different winding 58a, 58b or 58c. Additionally, each of such principal magnetic circuits is magnetically uncoupled from the two other principal magnetic circuits. Each principal magnetic circuit is formed by a different principal magnetic pole 30, 31 or 32, by the magnetic flux guidance branch 56a, 56b or 56c coupled to such principal magnetic pole as well as by the return pole defined by the second principal stator part 24. It will be noted that the structure of the transducer according to the invention shows the advantage of being little sensitive to external magnetic fields.

Given the configuration of teeth 40 of the first circular crenellation 44 as well as the corresponding configuration of teeth 66 of the second circular crenellation 64, such transducer may easily function in a stepping mode. It will be noted that it is possible with a multipolar permanent magnet comprising twenty pairs of magnetic poles to effect sixty steps per revolution of rotor 4 in any given sense.

The three phase configuration of the transducer according to the first embodiment of the invention thus enables effecting sixty steps per revolution with the help of a multipolar magnet 10 comprising only twenty rotor pole pairs 14, each having a magnetic axis oriented coaxially to the rotation axis 8. In the case in which the transducer is used in order to advance the seconds hand in a time counter, the transducer according to the first embodiment of the invention described hereinbefore enables advancing such hand easily with a frequency of 1 Hz by direct drive.

It will also be noted that the transducer according to the first embodiment of the invention exhibits a compact structure from which there results a minimum space occupation. Next the central position of the rotor relative to the stator gives rise to a maximum of space available for the multipolar permanent magnet 10.

Figure 4:
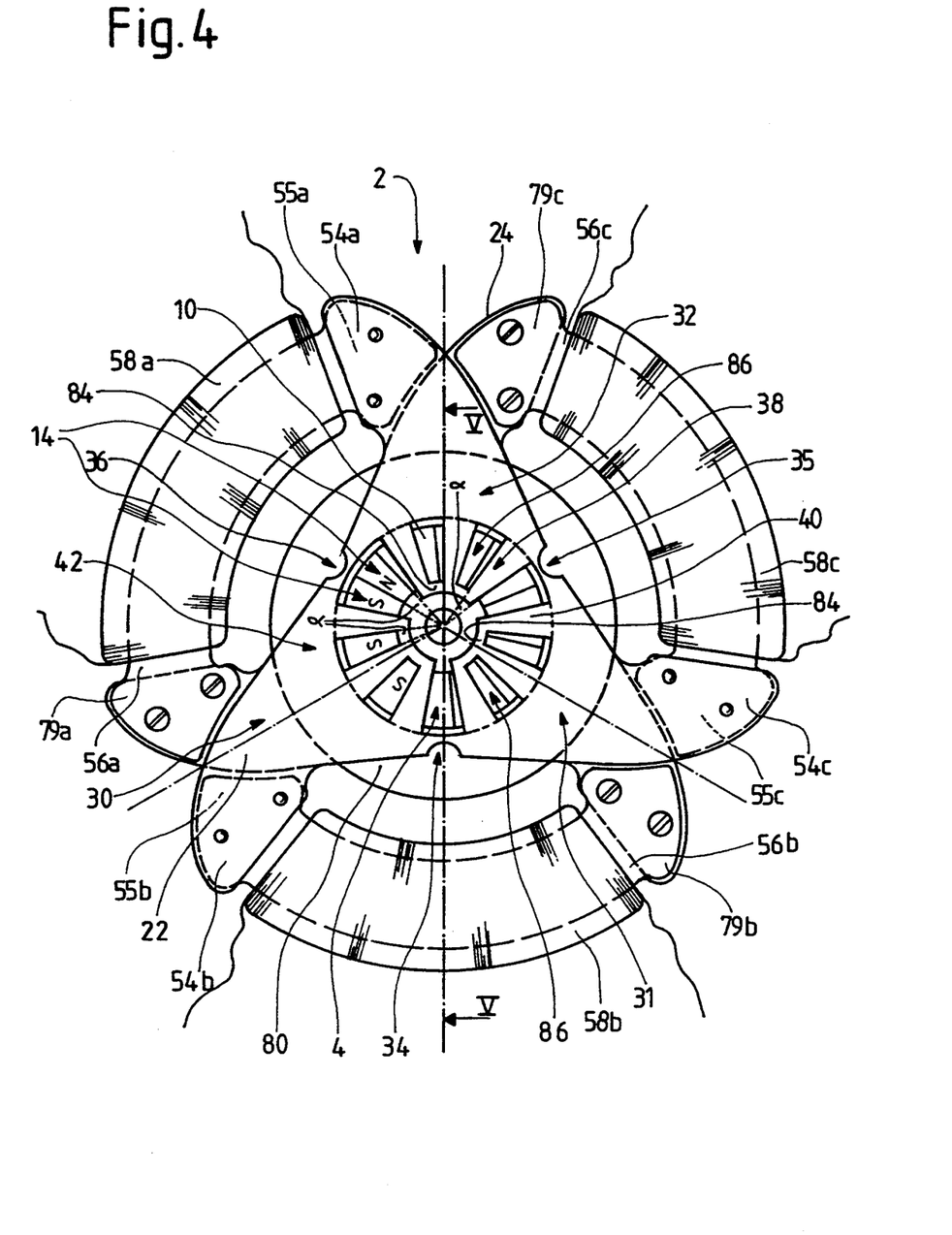
FIG. 4 shows a variant of the first embodiment of an electromagnetic transducer shown on FIG. 1 in accordance with the invention.
Figure 5:
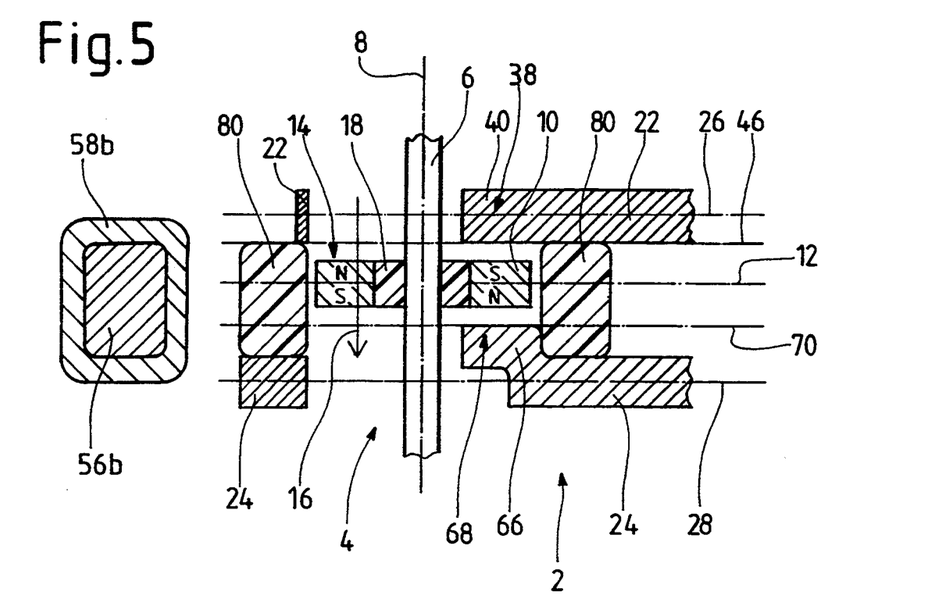
FIG. 5 is a cross-sectional view of FIG. 4 along the section line V—V.
Figure 6:
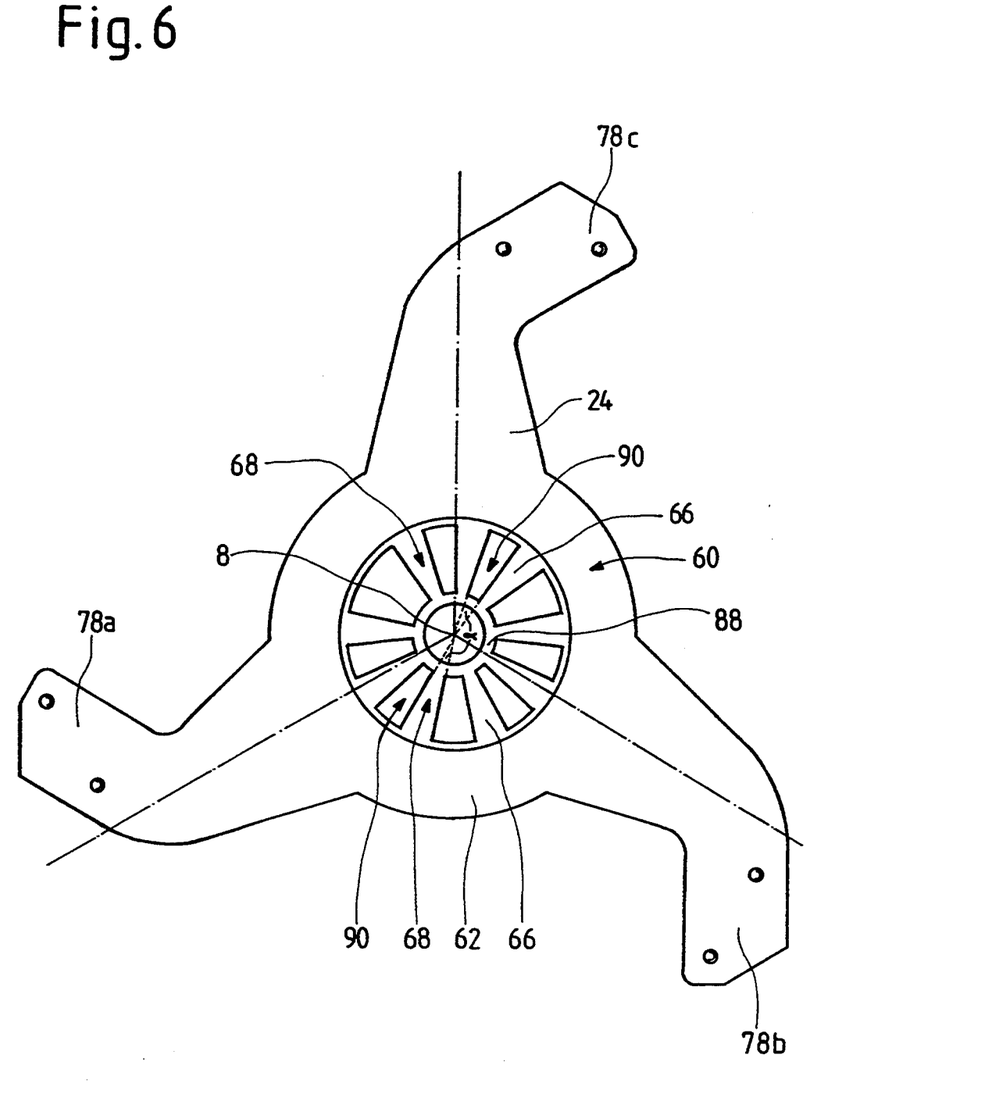
FIG. 6 is a top schematic view of a second principal stator part of said variant shown on FIG. 4.

Referring hereinafter to FIGS. 4 to 6, there will be described a variant of the first embodiment of an electromagnetic transducer according to the invention. The references already discussed in detail in the first embodiment described hereinbefore will not be again discussed for the description of such variant.

Initially, it will be noted that the configuration of the magnetic flux guidance branches 56a, 56b and 56c exhibit the form of an arc of a circle as do windings 58a, 58b and 58c assembled on such magnetic flux guidance branches.

Next, there has been provided a stabilization ring 80 which is non-magnetic and preferably non-conducting arranged between the first principal stator part 22 and the second principal stator part 24. As seen on FIG. 5, such stabilization ring 80 is maintained fixed relative to a lateral displacement thanks to teeth 66 forming the secondary pole 68 of the return pole 60. Effectively, teeth 66 belonging to the second principal stator part 24 have been dished towards the multipolar permanent magnet 10 relative to the second general plane 28 in which is basically located the second principal stator part 24. The difference in level brought about by such dishing enables the wedging of the stabilization ring 80. Such stabilization ring 80 serves as an inset piece between the two principal stator parts 22 and 24. It thus serves to maintain a fixed distance separating the two principal stator parts 22 and 24.

On FIG. 4, it will be observed that teeth 40 forming the secondary poles 38 of a common principal pole 30, 31 or 32 belonging to the first principal stator part 22 are coupled among themselves by a stiffening bridge 84. Thus, teeth 40 form the risers of windows 86, such windows 86 corresponding substantially to the embrasures of the first embodiment of the invention described with the help of FIGS. 1 to 3. In a preferred manner, the stiffening bridge 84 is thin between teeth 40 forming a neck at the limit.

It will be noted that the angular distribution in the first stator plane 46 of teeth 40 forming the secondary poles 38 of the first stator part 22 and windows 86 is respectively identical to the angular distribution of the castellations and the embrasures of the first embodiment described with the help of FIGS. 1 to 3.

It will be further remarked that in a preferred manner, the three stiffening bridges 84 are not superposed onto the multipolar permanent magnet 10 relative to a projection thereof in the rotor plane 12.

In a manner similar to the first stator part 22 of the variant here described, the second stator part 24 of such variant represented on FIG. 6 comprises a circular stiffening bridge 88 coupling the teeth 66 defining the secondary poles 68 of the return pole 60. Again, teeth 66 form risers of a set of windows 90 arranged in a circular manner about the rotation axis 8. The angular distribution of teeth 66 forming the secondary pole 68 of such variant is identical to the angular distribution of teeth 66 of the first embodiment of the second principal stator part shown on FIG. 3.

Figure 7:
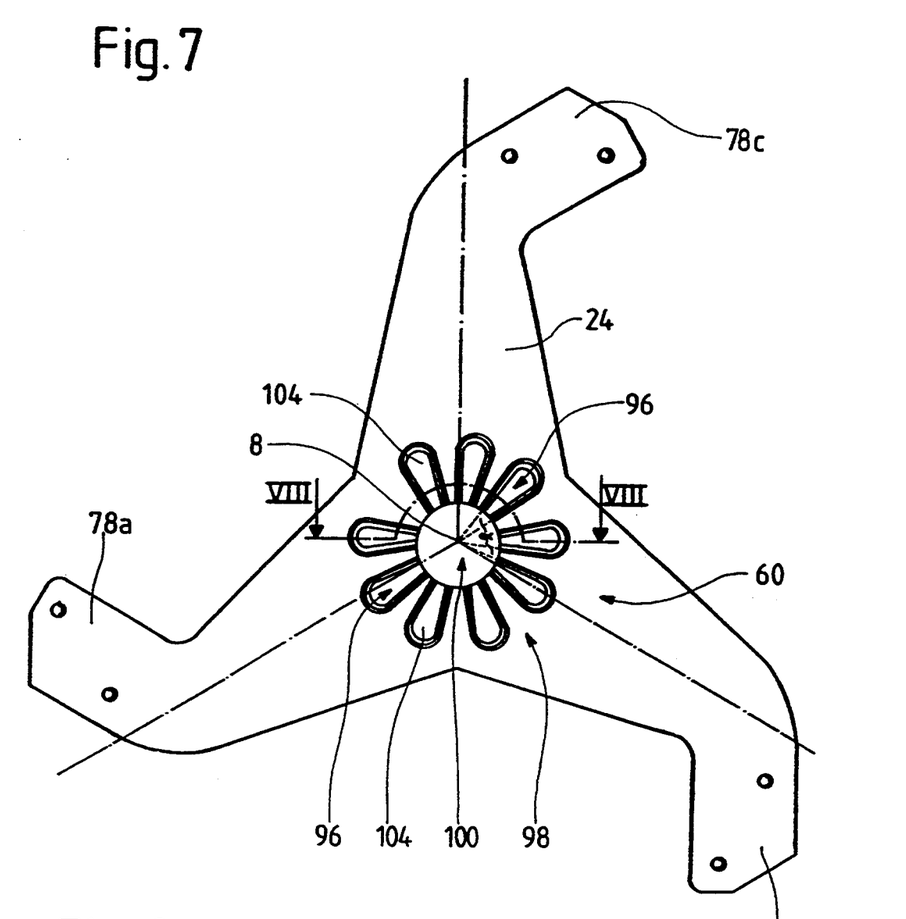
FIG. 7 shows the second principal stator part of a second embodiment of the transducer according to the invention.
Figure 8:
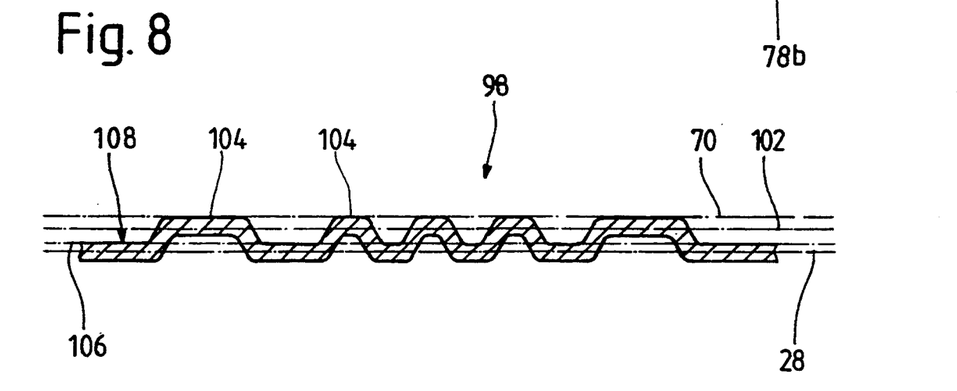
FIG. 8 is a cross-section view of FIG. 7 along the section line VIII—VIII.

Referring hereinafter to FIGS. 7 and 8, there will be described a second embodiment of an electromagnetic transducer according to the invention.

Such second embodiment of a transducer according to the invention differs from the first embodiment by the form of the second principal stator part 24 and by the formation of the secondary poles 68 of the return pole 60 formed by such second principal stator part 24 shown on FIG. 7. Such second stator part 24 exhibits in its central region an undulated annular region hereinafter referred to as the circular undulation 98 being developed around the rotation axis 8 of rotor 4 (not shown on FIG. 7). Such circular undulation 98 exhibits substantially the form of a ring defining a circular opening 100 centered on the rotation axis 8.

The circular undulation 98 is formed in a manner such that the summits 104 of such circular undulation 98 situated at the side of the multipolar permanent magnet 10 (not shown on FIG. 7) relative to a median plane 102 from the surface of such undulation 98 define the secondary poles 68 of the return magnetic pole 60. Next, the second stator plane 70 defined substantially by the set of summits 104 of the circular undulation 98 is located at the side of the multipolar permanent magnet relative to plane 106 defined by the surface 108 of such second principal stator part 24 outside the undulation 98.

Again, the summits 104 forming the secondary poles 68 show an angular distribution identical to the secondary poles 38 of the first embodiment of the invention. Next, such summits 104 are at least partially superposed onto said multipolar magnet and onto said secondary poles of the first stator part 24 (not shown on FIG. 7) relative to a projection thereof in said rotor plane 12.

It will be noted that in a variant (not shown) of this second embodiment of a transducer according to the invention, there is provided an undulation similar to that described hereinbefore for the secondary magnetic poles 38 of a common principal pole 30, 31 or 32 belonging to the first principal stator part 22 (with reference to FIG. 1). In this variant, three undulated annular sections are provided, each of such three undulated annular sections belonging to a common principal magnetic pole of the first principal stator part, the summits of the undulation located at the side of the multipolar permanent magnet 10 (with reference to FIG. 1) defining the secondary poles 38 of such first principal stator part.

Figure 9:
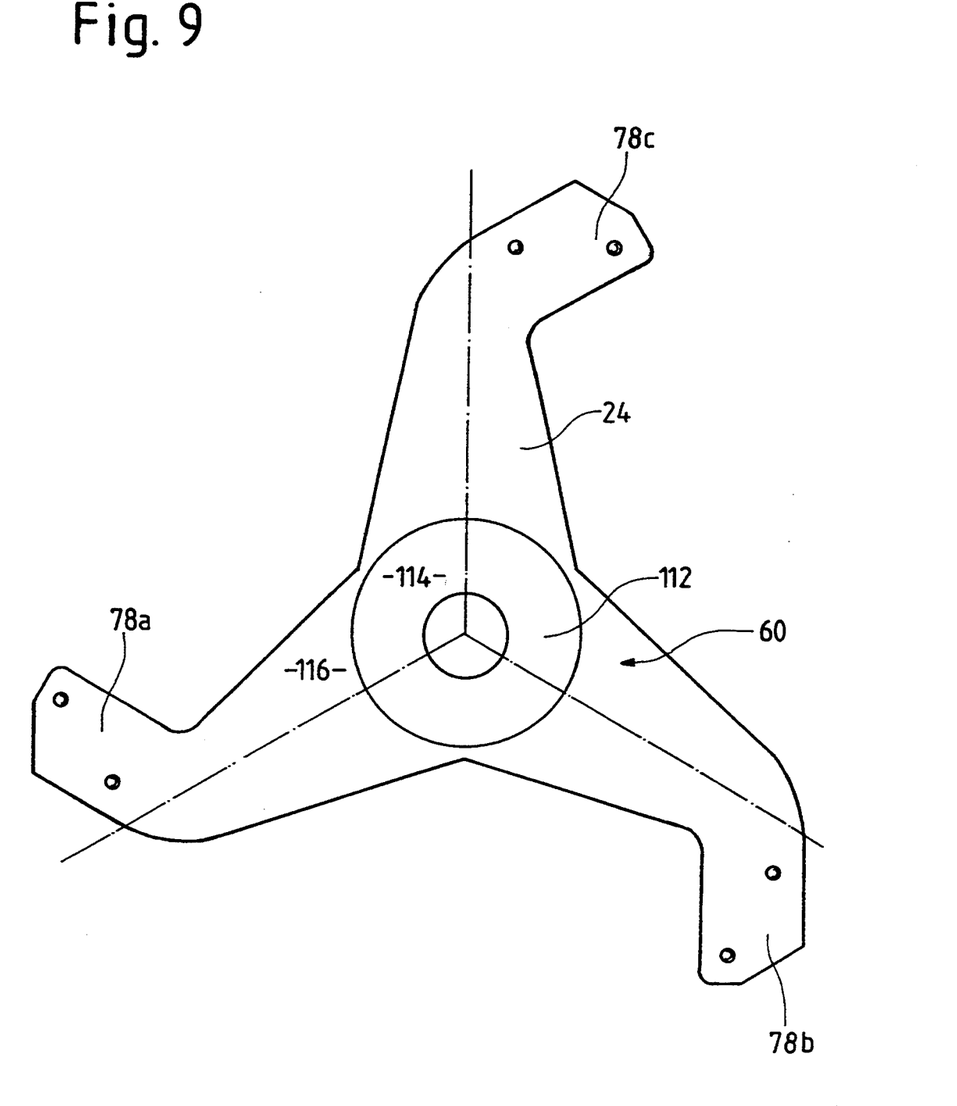
FIG. 9 is a top view of a second principal stator part of a third embodiment of a transducer according to the invention.

Referring hereinafter to FIG. 9, there will be described a third simplified embodiment of the second principal stator part 24.

In this simplified embodiment, return pole 60 defined by the second principal stator part 24 no longer comprises secondary poles. Only a filled-in annular portion 112 the surface 114 of which is located in a plane different from the complementary surface 116 of the second principal stator part 24 is provided.

The surface 114 of annular portion 112 defines a second stator plane which is located at the side of the multipolar permanent magnet (not shown in FIG. 9) relative to surface 116 of the complementary portion of the second principal stator part 24.

In a general manner, it will be noted that the embodiment chosen for the first principal stator part can be independent of the embodiment chosen for the second principal stator part. Next, the configuration of the magnetic flux guidance branches 56a, 56b and 56c as well as their arrangement may exhibit multiple variants.

It will be further noted that in a simplified embodiment the first and second principal stator parts can be entirely planar. In such case it is possible to provide a configuration in which the superposition region between the two principal stator parts is minimal outside the region of the multipolar permanent magnet, this in order to diminish as far as possible the losses of magnetic flux.

Finally, it will be noted that the invention described herein with the help of a three-phase transducer can, without further invention, be applied to a transducer comprising more phases, in particular to a five-phase transducer.

What we claim is:

1. An electromagnetic transducer comprising a stator and a rotor mounted to rotate relative to the stator, said rotor being adapted to spin around a rotation axis, defined by a positioning axle of such rotor, and including a multipolar permanent magnet which defines a rotor plane perpendicular to said rotation axis and is formed by a set of rotor pole pairs arranged in a circular manner about said rotation axis, the number of such rotor pole pairs being even and greater than two, each rotor pole pair having a magnetic axis oriented substantially along the direction of said rotation axis with a sense opposite to that of the adjacent pole pairs and defining an angle $\alpha$ in said rotor plane relative to said rotation axis the value of which is substantially equal to 360° divided by said number of rotor pole pairs, and including N magnetic energization means respectively associated with N magnetic flux guidance branches, N being an integer greater than two, and comprising first and second principal stator parts, the first principal stator part defining N principal magnetic poles magnetically insulated from one another by zones of high magnetic reluctance and having a first superposition portion superposed onto said multipolar permanent magnet relative to a projection thereof in said rotor plane, each of such principal magnetic poles including at least one secondary magnetic pole, which is at least partially superposed onto said said multipolar permanent magnet relative to a projection thereof in said rotor plane, said secondary magnetic poles substantially defining a first stator plane parallel to said rotor plane, each secondary magnetic pole defining in said first stator plane an angle relative to said rotation axis the value of which is substantially equal to that of said angle $\alpha$, each secondary pole of each of said principal magnetic poles being angularly shifted relative to each secondary pole of each of the two adjacent principal magnetic poles and relative to said rotation axis by a deviation angle the value of which, modulo the value of said angle $\alpha$ is equal to said value of such angle $\alpha$ divided by N, said second principal part defining a magnetic return pole a second superposition portion of which is superposed onto said multipolar permanent magnet relative to a projection thereof in said rotor plane, such second superposition portion substantially defining a second stator plane parallel to said rotor plane, said first and second stator planes being located on either side of said rotor plane, each of said magnetic flux guidance branches having a first end magnetically coupled to a different said principal magnetic pole and a second end magnetically coupled to said return pole.

2. The transducer as set forth in claim 1, wherein each of said principal magnetic poles of said first principal stator part comprises at least two secondary magnetic poles, the adjacent secondary magnetic poles belonging to a common principal magnetic pole being angularly shifted relative to one another in the first stator plane and relative to said rotation axis through an angle the value of which is substantially equal to twice the value of said angle $\alpha$.

3. The transducer as set forth in claim 2, wherein said first and second principal stator parts respectively comprise first and second portions which are not superposed onto said permanent magnet relative to a projection thereof in said rotor plane, such first and second non-superposed portions being respectively basically located in first and second general planes parallel to one another, said magnetic flux guidance branches being basically located in the region comprised between such first and second general planes, each of said magnetic energization means being formed by a coil on a different said branch.

4. The transducer as set forth in claim 2 or in claim 3, wherein said first principal stator part is entirely planar and located in said first general plane.

5. The transducer as set forth in claim 2 or in claim 3, wherein said first superposition portion of said first principal stator part exhibits at least partially an over-thickness relative to said first general plane in the direction of said multipolar permanent magnet.

6. The transducer as set forth in claim 2 or in claim 3, wherein said first superposition portion of said first principal stator part is at least partially dished relative to said first general plane in the direction of said multipolar permanent magnet.

7. The electromagnetic transducer as set forth in claim 2, wherein said secondary poles of said first principal stator part are formed by the teeth of a first circular crenellation.

8. The transducer as set forth in claim 2, wherein the secondary poles belonging to a common principal magnetic pole of said first principal stator part are formed by teeth coupled among themselves by a stiffening bridge so as to define at least one window.

9. The transducer as set forth in claim 2 or in claim 3, wherein the first superposition portion of said first principal stator part is undulated, each of said secondary magnetic poles of such first principal stator part being formed by a summit of such undulated superposition portion, such summit being located at the side of said multipolar permanent magnet relative to a median plane of the surface of such undulated first superposition portion, such latter forming N undulated annular sections, each of such undulated annular sections belonging to a different principal magnetic pole.

10. The transducer as set forth in claim 2, wherein said second superposition portion defines a filled-in annular portion of said second principal stator part.

11. The transducer as set forth in claim 2, wherein said return magnetic pole of said second principal stator part also includes secondary poles superposed relative to a projection thereof onto said rotor plane, at least partially onto said secondary poles of said first principal stator part and at least partially onto said multipolar permanent magnet, the secondary poles of the second principal stator part having an angular distribution in said second stator plane relative to said rotation axis substantially identical to that of the secondary poles of the first principal stator part.

12. The transducer as set forth in claim 11, wherein said first and second superposition portions are entirely superposed onto one another relative to a projection thereof onto said rotor plane.

13. The transducer as set forth in claim 11 or in claim 12, wherein said secondary poles of said return magnetic pole are formed by the teeth of a second circular crenellation.

14. The transducer as set forth in claim 11 or in claim 12, wherein said secondary poles of said return magnetic pole are formed by teeth coupled among themselves by a circular stiffening bridge in a manner to define a set of windows circularly arranged around said rotation axis.

15. The transducer as set forth in claim 10, wherein said second superposition portion of said second principal stator part exhibits at least partially an over-thickness in the direction of said multipolar permanent magnet relative to said second general plane.

16. The transducer as set forth in claim 10, wherein said second superposition portion is at least partially dished in the direction of said multipolar permanent magnet relative to said second general plane.

17. The transducer as set forth in claim 12, wherein said said second superposition portion exhibits an undulation, each of said secondary poles of said return magnetic pole being formed by a summit of such undulation, such summit being located on the side of said multipolar permanent magnet relative to the median plane of the surface of such undulation.

18. The electromagnetic transducer as set forth in claim 1, comprising a stabilization ring arranged between said first and second principal stator parts.

19. The transducer as set forth in claim 1, of the three-phase type, N being equal to 3.

* * * * *